United States Patent [19]
Falk et al.

[11] 3,713,633
[45] Jan. 30, 1973

[54] ROTARY DRYER

[76] Inventors: Joseph H. Falk, 4935 Wells Dr., Mission, Kans. 66205; Lauren W. Burnett, 3700 Pennsylvania, Dubuque, Iowa 52001

[22] Filed: Oct. 7, 1971

[21] Appl. No.: 187,419

[52] U.S. Cl. ................................... 263/33 R, 34/135
[51] Int. Cl. .............................................. F27b 7/00
[58] Field of Search ...... 263/33, 34, 32; 34/135, 136, 34/137, 182, 183

[56] References Cited

UNITED STATES PATENTS

| | | | |
|---|---|---|---|
| 2,921,779 | 1/1960 | Spence | 263/32 R |
| 3,245,154 | 4/1966 | Bojner et al. | 263/33 R |
| 3,407,511 | 10/1968 | Camm | 263/33 R |

Primary Examiner—John J. Camby
Assistant Examiner—Henry Yuen
Attorney—Schmidt, Johnson, Hovey & Williams

[57] ABSTRACT

A rotary dryer having a rotating drum presenting a central chamber and outer chamber separated by a perforated wall, wherein granular material is transported through the outer chamber, and a material-drying airflow conducted into the central chamber flows radially through the outer chamber and material therein. Vanes disposed in separate, annular flights in the outer chamber effect complete circular tumbling and horizontal transporting of the material in multiple passes back and forth along the entire length of the drum at substantially right angles to the radial airflow. The form of the invention illustrated is capable of flash-drying and heating grain crops as a continuous process immediately after and as a part of the harvesting of the grain.

22 Claims, 6 Drawing Figures

INVENTORS.
Joseph H. Falk
Lauren W. Burnett

BY Schmidt, Johnson, Hovey & Williams
ATTORNEYS.

INVENTORS.
Joseph H. Falk
Lauren W. Burnett

BY Schmidt, Johnson,
Hovey & Williams
ATTORNEYS.

ROTARY DRYER

This invention relates to apparatus for exposing and treating granular material such as grain, chemicals or the like with an airflow.

It is an important object of the present invention to provide a horizontally disposed, rotatable drum having a central and an outer chamber therewithin separated by a perforated cylindrical wall permitting radial flow of air between the chambers, the drum having spaced, inlet and outlet ports communicating with the outer chamber to conduct granular material to be treated by the radial airflow into and out of the outer chamber, and wherein is included directing means in the outer chamber for effecting controlled circular tumbling and horizontal transporting of the material within the outer chamber substantially along the entire length of the drum during rotation thereof so that the material is transported throughout substantially the entire volume of the annularly-shaped outer chamber and to continually expose a maximum surface area of the material to the radial airflow for optimally efficient treatment thereby.

It is another object of the present invention to provide apparatus constructed in accordance with the preceding object, wherein said directing means is oriented and sized in correlation with the velocity and temperature of the radial airflow and the rotational speed of the drum so as to effect flash-drying and heating of the granular material during the circular tumbling and horizontal transporting thereof in the outer chamber.

It is another important object of the present invention to provide directing means in the outer chamber which comprise a set of vanes, each of which defines an open pocket for receiving and circularly raising the material during one part of the drum rotation and permitting circular falling of the material out of the pockets during another part of drum rotation so as to cause continual, circular tumbling of the material completely around the drum, each vane having an inclined, generally horizontally extending plate upon which the material impinges when falling so as to effect horizontal shifting of the material ultimately along the entire length of the drum.

It is another object of the present invention to provide in apparatus of the class described, a plurality of concentric, cylindrical, perforated sleeves in the outer chamber for separating the latter into a corresponding number of horizontally extending, annular flights through which said material passes sequentially back and forth along the entire length of the drum so as to present a compact drum having a path of maximum length in the outer chamber along which the material travels and tumbles for exposure to the radial airflow, thereby presenting compact drying apparatus of sufficiently large capacity whereby to be capable of receiving and drying grain crops or the like immediately after and as a part of the procedure in harvesting the grain.

It is another object of the invention to provide means for heating and drawing air by venturi action through an inlet duct in the drum axially into the central chamber for subsequent radial flow therefrom through the outer chamber and perforated sleeves to heat and dry the granular material, and wherein is included a cylindrical liner wall located radially inwardly from the outer chamber to define an insulative air chamber space between the central and outer chambers that prevents scorching or burning of the material while being dried.

It is another object of the present invention to provide a drive shaft for rotating the drum, which shaft presents a foraminated inner end within the central chamber, said shaft being hollow and adapted to direct pressurized steam into the central chamber to steam-temper the material while tumbling and traveling in the outer chamber, the shaft inner end being spaced from the aforementioned inlet duct so as to present a single piece of equipment capable of either steam-tempering or flash-drying and heating granular material.

It is another object of the present invention to provide a stationary, hollow casing enclosing the rotating drum and defining an enclosed space surrounding the latter, which casing is provided with first and second vents for respectively exhausting the granular material and airflow discharged from the drum, there being an exhaust fan at the second vent for assisting in drawing the radial airflow through the drum, and wherein the enclosed space is otherwise air-locked to increase the efficiency of the exhaust fan in drawing the radial airflow through the drum.

It is another object of the present invention to provide apparatus of the class described wherein the velocity of the radial airflow, the drum speed, the rate of material flow, and the retention time thereof in the outer chamber, all are adjustable so as to permit use of the apparatus in drying or otherwise treating a variety of materials of different granular sizes, textures and properties to increase the versatility of the apparatus.

These and other objects and advantages of the present invention are specifically set forth in or will become apparent from the following detailed description of a preferred embodiment of the invention when read in conjunction with the accompanying drawings, wherein.

Figure 1:
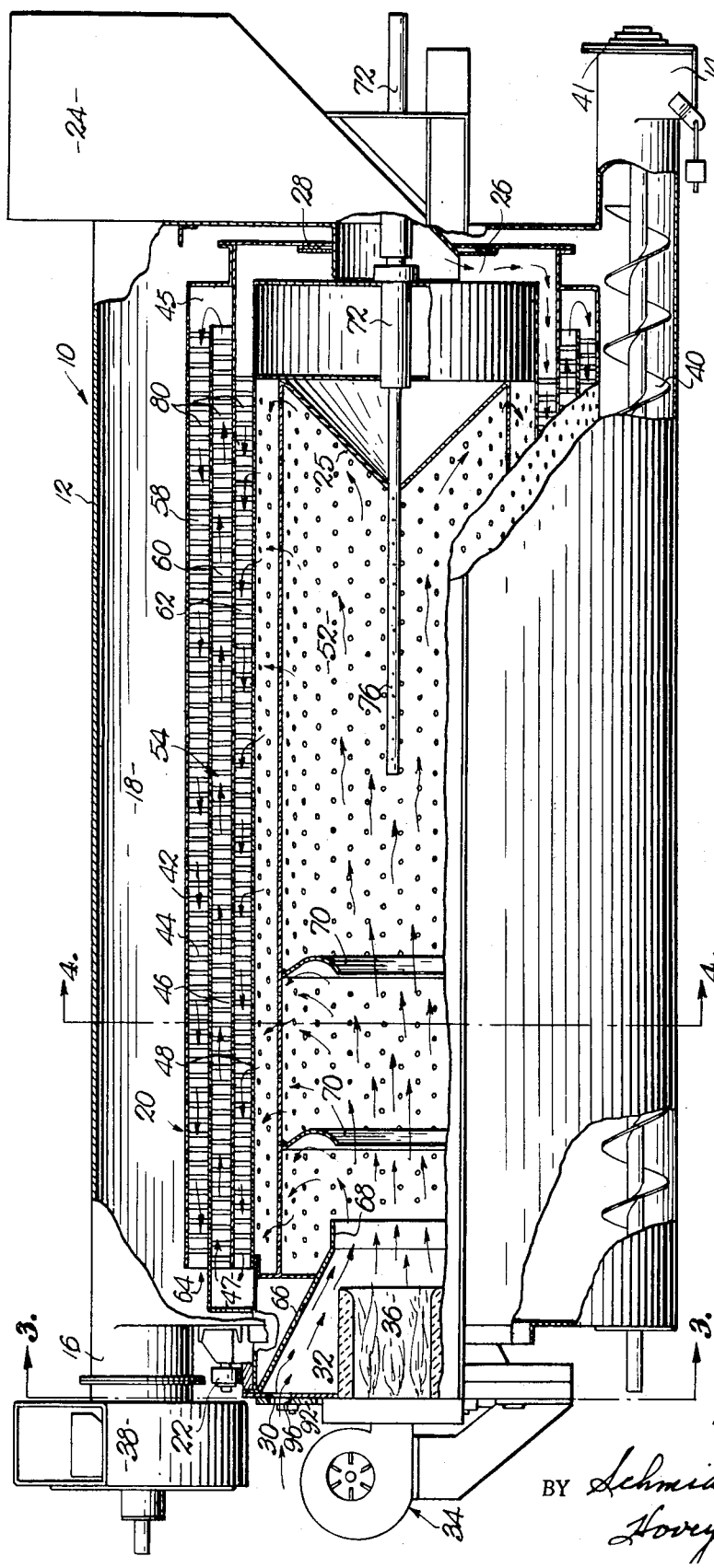
FIG. 1 is a partial longitudinal, cross-sectional view of the rotary dryer.

Illustrated in the drawings is a rotary dryer which presents a stationary frame generally referred to by the numeral 10 that includes an enclosed, hollow casing 12 having spaced, first and second vents 14 and 16 opening into the enclosed interior space 18 thereof. An elongated, horizontally disposed, cylindrical drum 20 is located within the casing 12 and is rotatably supported at its opposite ends upon the casing by a plurality of rollers 22 or other suitable support means.

Mounted at one end of the frame 10 is a material-collecting hopper 24 presenting first conduit means communicating with a material inlet port area 26 that is sealed at juncture 28 from the enclosed space 18 that surrounds drum 20. At the opposite end of the casing 12 the drum has a plurality of angularly-spaced apertures 30 presenting second conduit means for conducting airflow through an inlet duct 32 in the drum 20. A burner 34 or other suitable heater is mounted upon frame 10 in central relationship to the ring of apertures 30 to present a combustion and heating chamber 36. An exhaust fan 38 is mounted at the second vent 16 so as to draw air out of the enclosed space 18 through vent 16. A horizontally extending, rotatable auger 40 is located within enclosed space 18 in alignment with the first vent 14 so as to move material from space 18 toward and out of the vent 14. A door 41 covering vent 14 normally closes the latter, and material augered to vent 14 is capable of opening door 41 for discharge from space 18.

The drum 20 includes a plurality of perforated, cylindrical concentric sleeves 42, 44, 46 and 48 and a similar, perforated liner wall 50 located radially inside the sleeves. The drum is closed at its opposite ends so that the sleeves and liner present inner and outer wall means that define a cylindrical, central chamber 52 within the drum, and an annular, outer chamber 54 surrounding the central chamber 52. Sleeve 48 and liner 50 define a thermally insulative, annular chamber 56 therebetween which separates and spaces the central and outer chambers 52 and 54 from one another. The sleeves 42–48 divide outer chamber 54 into a corresponding trio of annular, horizontally extending flights 58, 60 and 62 between adjacent ones of the sleeves. Sleeve 44 has an opening 45 at its right-hand end as viewed in FIG. 1, in order to interconnect flights 58 and 60, and the sleeve 46 has an opening 47 at its left-hand end for interconnecting flights 60 and 62. The rightward end of innermost flight 62 communicates with inlet port 26, while at the left-hand end of the outermost flight 58 there is provided an outlet port 64 in the drum 20. The flights thereby present a path along which material is conducted through said outer chamber from the inlet port 26 leftwardly and horizontally through flight 62, then rightwardly along the entire length of drum 20 through flight 60, and then finally back leftwardly along flight 58 to outlet port 64.

At the left-hand end of rotating drum 20, as viewed in FIG. 1, there is provided a conically-shaped wall 66 extending into the central chamber 52 and in surrounding relationship to combustion chamber 36. A short cylinder 68 at the smaller end of conically-shaped wall 66 presents a throat area intermediate the combustion chamber 36 and central chamber 52. This arrangement presents venturi means for drawing airflow through apertures 30 along with the combustion products from chamber 36 by venturi action generally axially into central chamber 52. One or more angularly-shaped air deflectors 70 are secured upon and protrude radially inwardly from the inner surface of liner 50 in order to deflect the axial airflow from the inlet duct 32 in a generally radial direction to pass through the perforated liner 50 and sleeves 42–48. The airflow thereby passes generally radially from central chamber 52 and sequentially through insulative chamber 56 and outer chamber 54 to be discharged from the drum 20 into enclosed space 18.

Figure 6:
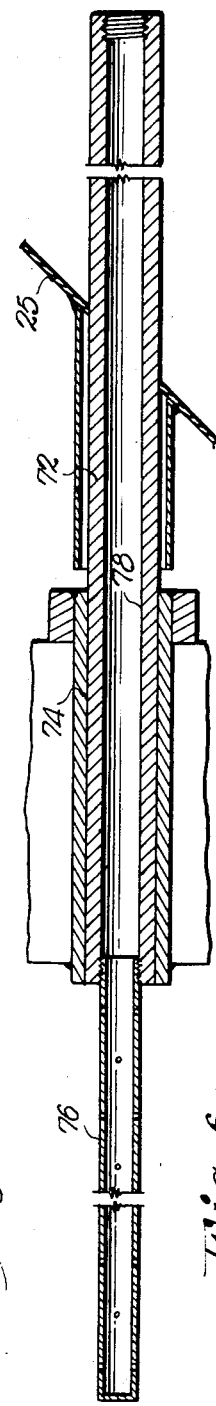
FIG. 6 is an enlarged, longitudinal, cross-sectional view of the drive shaft.

A centrally located, hollow drive shaft 72 (as shown in FIG. 6) extends from the exterior of casing 12 and through a portion of the wall 25 defining hopper 24 to drivingly engage the right-hand end of drum 20 as at juncture 74. A sparger pipe 76 is affixed upon drive shaft 72 and communicates with the interior 78 thereof so as to present a foraminated inner end of the drive shaft which is disposed within central chamber 52. The outer end of the drive shaft is adapted to operatively couple the drum 20 with a power source for rotating the drum. The outer end of shaft 72 is also adapted to be coupled to a suitable source of heated and pressurized steam, from which source the shaft interior 78 presents an inlet duct for conducting the steam into central chamber 52.

Figure 4:
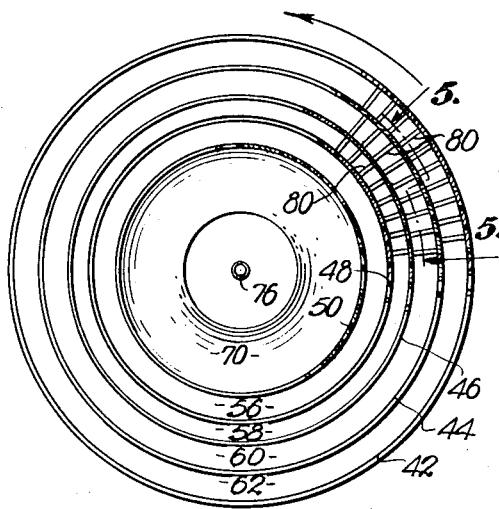
FIG. 4 is a partial transverse, cross-sectional view taken along line 4—4 of FIG. 1.
Figure 5:
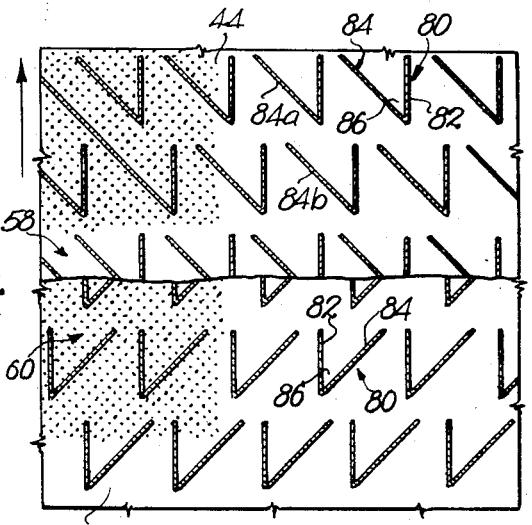
FIG. 5 is a fragmentary and offset, enlarged, radial cross-sectional view taken along line 5—5 of FIG. 4.

As clearly illustrated in FIGS. 4 and 5, a set of vanes 80 is included within each flight 58, 60 and 62. Each of these vanes 80 includes a circularly disposed plate 82 and an inclined, generally horizontally extending plate 84 having one end secured to the corresponding circular plate 82 so as to define a pocket area 86 therebetween. The sets of vanes 80 associated with adjacent flights, such as the flights 58 and 60 illustrated in FIG. 5, have their horizontal plates 84 inclined oppositely relative to one another so that, when viewed radially as in FIG. 5, the adjacent sets of vanes appear to be respectively of a left-hand check mark and right-hand check mark configuration.

Each of the vanes 80 extends completely radially across the associated flight and has its opposite edges secured to the adjacent sleeves which define the flight. The spaced vanes thereby present radial support for the concentric sleeves 42–48 of the drum 20, and also present obstructions within the outer chamber 54 for controlling and directing movement of material therethrough.

Each set of vanes in a corresponding flight has its vanes arranged in angularly-spaced, horizontally-extending rows which extend leftwardly and rightwardly as viewed in FIG. 5. The vanes are also arranged in horizontally spaced, circular columns extending 360° completely around the drum, these columns being disposed in an up-and-down direction in FIG. 5. The circular columns are so horizontally spaced that the horizontal plates 84 of the vanes associated with adjacent columns overlap one another in a horizontal direction. For instance, the horizontal plates 84a and 84b can be seen to overlap one another in a left and right direction in FIG. 5 due to the horizontal, columnar spacing of the vanes associated therewith.

Figure 3:
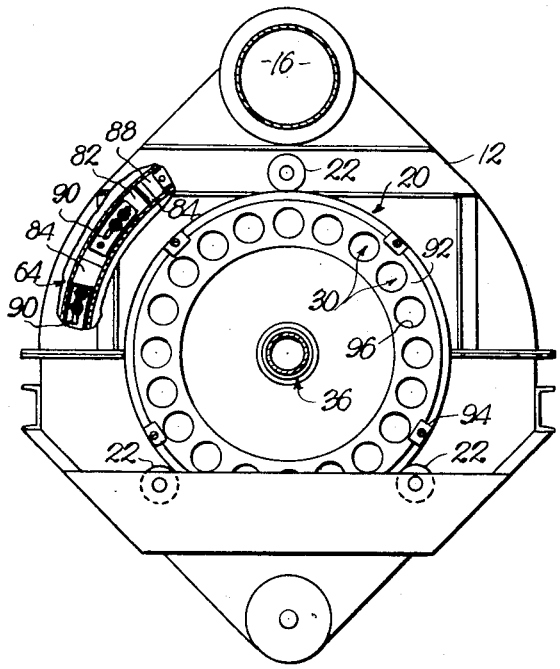
FIG. 3 is a transverse, cross-sectional view taken generally along line 3—3 of FIG. 1.
Figure 2:
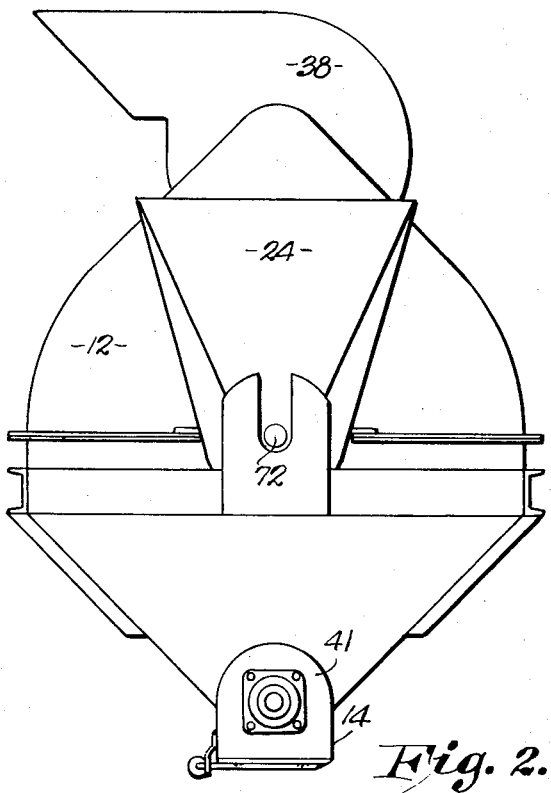
FIG. 2 is a plan view of one end of the dryer.

The outlet port 64 of drum 20 comprises a circular array of spaced apertures 88, as can best be seen in FIG. 3, between adjacent and aligned plates 82 associated with the left endmost column of vanes 80 in the outermost flight 58. An adjustable, arcuately formed outlet gate 90 is secured upon one of the plates 82 for adjusting movement toward the adjacent plate 82 so as to vary the size of the aperture 88. A corresponding adjustable outlet gate 90 may be provided at each aperture 88 so as to permit adjustment in the size of the opening presented by the outlet port 64. Similarly, the apertures 30 associated with inlet duct 32 may be varied in size by angularly shifting a shutter ring 92 secured by loosening clamps 94 in overlying relationship to apertures 30. As shutter ring 92 is shifted angularly, the holes 96 in the shutter ring 92 become misaligned with the corresponding apertures 30 in order to variably, partially close apertures 30 as desired.

To add to the versatility of the invention, the frame 10 may include wheels so as to present a mobile unit capable of being pulled behind harvesting equipment or the like. Appropriate means for rotatively driving drum 20 and for operating the exhaust fan 38, burner 34 and auger 40, may be included upon frame 10 or otherwise suitably interconnected with the apparatus to operate the devices listed.

In operation, the apparatus will be described as functioning to flash-dry, heat or otherwise treat cereal grain such as wheat or corn immediately subsequent to field harvesting thereof. Such operation is exemplary in nature only, as the invention is capable of treating many other types of granular material with an airflow and in processes other than flash-drying and heating.

The apparatus is pulled behind harvesting machinery, and hopper 24 is fed and filled with grain harvested thereby. The grain material flows through inlet port 26 to pass through outer chamber 54 in horizontally back-and forth-directions through the several flights 58, 60 and 62 to exit through outlet port 64 into enclosed space 18. The material falls to the bottom of casing 12 and is subsequently driven by auger 40 out of vent 14. The heated airflow from inlet duct 32 passes radially through the several flights into the outer chamber 54 in order to effect flash-drying and heating of the material being transported through outer chamber 54. The radial airflow passes through the outermost perforated sleeve 42 into enclosed space 18 and is thereupon drawn by exhaust fan 38 through vent 16 to exhaust from space 18. In the preferred form, inlet duct 32, as well as inlet port 26, are sealed from enclosed space 18 so that exhaust fan 38 draws only the heated radial airflow passing through outer chamber 54 so as to increase the efficiency of airflow through chamber 54. Also, vent 41 and inlet port 26 are sized so as to be normally choked by material presented thereto by the auger and hopper respectively, to prevent intake of extraneous air through vent 14 and hopper 24 into enclosed space 18 and outer chamber 54 to further increase the efficiency of radial airflow through outer chamber 54. Thus, substantially the only airflow through the apparatus will be from inlet duct 32 radially through outer chamber 54 to vent 16. While the central chamber 52 and liner 50 may be permitted to reach quite high temperatures, the insulative chamber 56 thermally insulates the granular material in outer chamber 54 from the excessive heat of the central chamber and prevents direct contact of the granular material with the liner wall 50 so as to prevent scorching or burning of the material.

The drum 20 rotates counterclockwise, as viewed in FIG. 5, and the vanes 80 moving in an upward direction in FIG. 5, so that the pockets 86 of the several vanes, scoop up and lift the material upwardly during one-half of the revolution of the drum 20. As these filled pockets start moving downwardly during the other half of revolution of the drum, the material carried therewithin falls from the pockets 86 to impinge upon the inclined, horizontal plates 84 of the acceding adjacent horizontal row of vanes 80. The horizontal plate 84 thereby shifts the falling material slightly leftwardly at least to the next column of vanes. Upon continued rotation of the drum therefore, the material gradually shifts horizontally along the corresponding flight and continually tumbles along a circular path so as to substantially fill the flight with tumbling grain material. For instance, the pocket associated with plate 84b will scoop up grain and lift same circularly upwardly while the vane is on the right-hand side of FIG. 4 and, after passing over top center, the grain will drop out of this pocket toward the acceding, inclined plate 94a which is now located somewhat below plates 94b. The grain will impinge upon plate 84a to be shifted leftwardly a small distance. As a continual process therefore, the grain circularly tumbles within the associated flight 58 and moves leftwardly therealong, as viewed in FIGS. 1 and 5, toward outlet port 64. It will be apparent that due to the relatively opposite inclination of the horizontal plates 84 associated with intermediate flight 60, the grain carried within flight 60 will gradually shift rightwardly as viewed in FIGS. 1 and 5.

This continuous, completely circular tumbling and horizontal transporting of the grain sequentially through the several flights, exposes a maximum surface area of the grain to the radial airflow passing through the chamber 54 substantially at right angles to the movement of the grain. Be essentially filling each of the flights in the outer chamber 54, the material itself presents a partial air-lock of the interior of drum 20 to maintain slight pressure therewithin. The airflow efficiently flash-dries and heats the grain during its travel through outer chamber 54. Upon subsequent exhaust through vent 14, the material will cool to the surrounding ambient temperature and thereby further dry the grain.

The invention thereby presents a compact unit of sufficiently large capacity to continuously receive and quickly dry the grain as it is harvested to permit practical, economical drying of the grain as a part of the harvesting procedure. The exhaust fan speed, drum speed, outlet gates 90 and shutter ring 92 may be adjustably varied as necessary in order to create the desired retention and consequent heating and drying of the material within outer chamber 54, while permitting the rate of flow of the material through the outer chamber to be matched and correlated with the flow of material into hopper 24.

The size of vanes 80 and inclination of their associated plates 84 may be altered as necessary in order to permit use of the apparatus for treating granular materials other than grain. The apparatus is also versatile in that different types of treating airflow may be introduced into the central chamber 52. For instance, a sourse of pressurized, heated steam may be coupled to hollow drive shaft 72 to introduce the steam into central chamber 52. The steam will flow radially through the perforated liner and sleeves in the same manner as the heated airflow from inlet duct 32 in order to effect steam-tempering of the material as desired. By locating the foraminated inner end 76 of the drive shaft at an end of the drum opposite inlet duct 32, the preferred form of the invention presents apparatus capable of either steam-tempering the material carried in outer chamber 54, or of flash-drying or heating the latter. In either case, the complete circular tumbling and horizontal transporting of the material through the outer chamber greatly enhances the efficiency of treating the material.

The apparatus presents a single vent 16 for exhausting airflow, combustion products and any other pollutants which may be carried within enclosed space 18. The apparatus thereby lends itself suitably for pollution control as anti-pollutant devices need be incorporated only at the vent 16.

Having thus described the invention, what is claimed as new and desired to be secured by Letters Patent is:

1. Apparatus for treating granular material with an airflow, comprising:
   a frame;
   an elongated, horizontally disposed, cylindrical drum rotatably mounted on said frame and having concentric, perforated, inner and outer wall means for defining a cylindrical, central chamber and an annular outer chamber in said drum, said drum having spaced, inlet and outlet ports communicating with said outer chamber for conducting said material to and from said outer chamber;
   means for conducting said airflow substantially radially through said outer chamber and perforated inner and outer wall means and into said central chamber;
   means operatively coupled with said drum for rotating the latter; and
   directing means in said outer chamber for effecting controlled circular tumbling and horizontal transporting of said material along substantially the entire length of said drum from said inlet port to said outlet port during rotation of said drum, whereby to expose said material to said radial airflow to be treated thereby throughout said circular tumbling and horizontal transporting of the material in said outer chamber.

2. Apparatus as set forth in claim 1, wherein said directing means includes a set of spaced vanes on said drum oriented in said outer chamber whereby to effect said circular tumbling and horizontal transporting of the material.

3. Apparatus as set forth in claim 2, wherein said vanes are angularly spaced in horizontal rows and horizontally spaced in overlapping circular columns in said outer chamber.

4. Apparatus as set forth in claim 3, wherein each of said vanes defines an open pocket for receiving and circularly lifting said material during one part of the rotation of said drum, said each vane having an inclined, generally horizontally extending plate for shifting said material horizontally during another part of the rotation of said drum when said material circularly falls from said open pockets.

5. Apparatus as set forth in claim 4, wherein said outer wall means includes a plurality of perforated concentric, cylindrical sleeves dividing said outer chamber into a plurality of concentric annular flights extending horizontally along substantially the entire length of said drum, adjacent ones of said sleeves being provided with openings at opposite ends of said drum whereby said material passes sequentially through said plurality of flights and horizontally back-and-forth along substantially the entire length of said drum during rotation of the latter.

6. Apparatus as set forth in claim 5, wherein is provided a corresponding set of said vanes in each of said flights, said horizontally extending plates associated with the vanes of adjacent sets being relatively oppositely inclined whereby said adjacent sets of vanes shift said material horizontally in opposite directions.

7. Apparatus as set forth in claim 5, wherein said vanes of each set extend completely raidally across the corresponding flight.

8. Apparatus as set forth in claim 7, wherein said inlet port communicates with the innermost one of said flights and wherein said outlet port communicates with the outermost one of said flights.

9. Apparatus as set forth in claim 8, there being an adjustable outlet gate on said drum at said outlet port for adjusting the aperture presented thereby to alter the rate of flow and retention time of said material in said outer chamber.

10. Apparatus as set forth in claim 1, wherein said airflow conducting means includes an inlet duct in said drum, said inlet duct communicating with said central chamber to conduct said airflow thereto and subsequently radially outwardly through said perforated inner wall means, said outer chamber and said perforated outer wall means.

11. Apparatus as set forth in claim 10, wherein said frame includes a hollow casing enclosing said drum and defining an enclosed space for receiving airflow and material discharged from said drum, said casing having first and second vents for respectively exhausting said discharged material said discharged airflow from said enclosed space, there being spaced, first and second conduit means sealed from said enclosed space for directing said material and said airflow through said casing respectively into said outer chamber and said central chamber.

12. Apparatus as set forth in claim 11, there being an exhaust fan at said second vent for assisting in drawing said airflow from said central chamber radially through said perforated first and second wall means and out of said enclosed space, said first vent being of a size adapted to be choked by said material whereby to obstruct intake of air through said first vent into said enclosed space.

13. Apparatus as set forth in claim 12, there being a horizontally disposed auger in said enclosed space for transporting said discharged material therein toward and out of said first vent.

14. Apparatus as set forth in claim 11, wherein said first conduit means includes a hopper disposed on the outside of said casing, said hopper being of a size for collecting said material and adapted to choke-feed said inlet port with said material whereby to obstruct intake of air into said outer chamber through said first conduit means and inlet port.

15. Apparatus as set forth in claim 10, there being means at said inlet duct for forcing a supply of heated airflow into said central chamber, whereby to maintain said central and outer chambers under pressure and to heat said material during said circular tumbling and horizontal transporting thereof in said outer chamber.

16. Apparatus as set forth in claim 15, wherein said inner wall means includes a perforated, cylindrical liner spaced radially inside said outer wall means for defining a thermally insulative, annular chamber between and separating said central and outer chambers, whereby said radial airflow passes sequentially through said insulative chamber and said outer chamber.

17. Apparatus as set forth in claim 16, wherein said directing means is oriented and sized in correlation with the velocity and temperature of said radial airflow and the speed of rotation of said drum whereby to effect flash-drying and heating of said material during said circular tumbling and horizontal transporting thereof in said outer chamber.

18. Apparatus as set forth in Claim 16, wherein said airflow supply means forces said airflow generally axially into said central chamber; there being a plurality of annular, inwardly extending deflectors secured to the inner surface of said liner for deflecting said axial airflow radially through said insulative chamber and said outer chamber.

19. Apparatus as set forth in claim 18, wherein said airflow supply means includes: heating means presenting a combustion chamber located at said inlet duct and opening toward said central chamber; and venturi means surrounding said combustion chamber and positioned with a throat portion thereof intermediate said combustion chamber and said central chamber, whereby to draw said airflow through said inlet duct into said central chamber.

20. Apparatus as set forth in claim 19, there being an adjustable shutter at said inlet duct for adjusting the aperture presented thereby, whereby to alter the velocity of said airflow drawn into said central chamber.

21. Apparatus as set forth in claim 16, there being a centrally located, hollow, rotary drive shaft operatively coupling said drum with said rotating means and defining said inlet duct within the interior of said shaft, said shaft having a foraminated, inner end disposed inside said inner chamber and an outer end communicating with said airflow supply means.

22. Apparatus as set forth in claim 21, wherein said airflow supply means includes a source of pressurized steam, whereby to steam-temper said material during said circular tumbling and horizontal transporting thereof in said outer chamber.

* * * * *